UNITED STATES PATENT OFFICE.

A. SHANNON, OF NEW YORK, N. Y.

IMPROVEMENT IN THE TREATMENT OF INDIA-RUBBER.

Specification forming part of Letters Patent No. 23,717, dated April 19, 1859.

*To all whom it may concern:*

Be it known that I, ALEXANDER SHANNON, of the city, county, and State of New York, have invented a new and useful Improvement in the Manufacture of India-Rubber; and I do hereby declare that the following is a full, clear, and exact description of the same.

Various materials have heretofore been mixed with india-rubber, such as sulphur, lead, and metallic oxides, &c. Cork has also been mixed with india-rubber in the form of small pieces or lumps for the purpose of increasing the bulk of the india-rubber and rendering it lighter and better adapted to particular uses; but in this instance there is no actual combination between the rubber and the cork.

The nature of my said invention consists in a peculiar process for preparing the rubber, whereby a combination takes place between the rubber and the cork, forming one homogeneous, light, elastic, water-proof, and durable article, that produces no injurious effects when used as articles of wearing-apparel or coverings for men or animals.

My process is to take cork ground to a fine or impalpable powder and grind the same with india-rubber and sulphur in any ordinary mill for grinding rubber as often as may be necessary to thoroughly mix the ingredients. I prefer and use the native gum before it has been melted by heat. In this state the rubber is to be rolled out into sheets, molded or otherwise wrought into the desired form, and may be used for some purposes—such as steam-packing, &c.—where the surrounding circumstances of heat and moisture produce the operation next set forth, although I prefer that the operation on the goods be first completed, as follows:

To cure or finish the compound of india-rubber produced as aforesaid, I place the same upon a grating or perforated support and cause hot steam to pass up below and through the said compound, or otherwise apply heat and moisture to the material, the effect of which is to cure or vulcanize the rubber, rendering the whole mass homogeneous, elastic, tough, and durable. The process of thus curing deprives the goods of all sulphurous smell, and the sulphur acts to form a compound with the cork and rubber in consequence of the presence of heat and moisture, for without moisture heat alone will not cure said goods properly.

The proportion of ground cork to india-rubber may be varied to a very considerable extent; but for most purposes I use nearly equal proportions, by weight, as this gives a good body combined with sufficient tenacity for most purposes, though a less or much greater proportion of cork may be used for some purposes. The proportion of sulphur should be about one-sixteenth of the weight of cork.

It will be thus apparent that the cork or other vegetable fiber is combined with the caoutchouc or other gum from the presence of sulphurous or similar acid generated under the action of heat and moisture, which, acting on both said vegetable fiber and the vegetable gum, makes a compound of the character set forth.

I do not claim the admixture of cork or other vegetable matter with caoutchouc or similar gums; neither do I claim treating india-rubber with sulphur, as that has been used in connection with metallic compounds, &c.; but

What I claim as my invention, and desire to secure by Letters Patent, is—

The method herein set forth of treating caoutchouc, so as to combine therewith cork or its equivalent, substantially as set forth.

A. SHANNON.

Witnesses:
W. TUSCH,
RICHARD H. CROSSINGHAM.